United States Patent

[11] 3,543,885

| [72] | Inventor | Harry G. Ditlow<br>564 Carman St., Camden, New Jersey 08163 |
|---|---|---|
| [21] | Appl. No. | 781,731 |
| [22] | Filed | Dec. 6, 1968 |
| [45] | Patented | Dec. 1, 1970 |

[54] FLUID BRAKE DEVICE
5 Claims, 4 Drawing Figs.

[52] U.S. Cl. .................................................. 188/90
[51] Int. Cl. ...................................................... F16d 57/02
[50] Field of Search ........................................ 188/90(A), 90(AS)

[56] References Cited
UNITED STATES PATENTS

| 2,204,589 | 6/1940 | Haller | 188/90(S)X |
| 2,517,531 | 8/1950 | Anderson | 188/90(A) |
| 2,672,954 | 3/1954 | Bennett | 188/90(A) |
| 2,730,200 | 1/1956 | Murphy | 188/90(S) |

FOREIGN PATENTS

| 380,664 | 9/1923 | Germany | 188/90(S)UX |

*Primary Examiner*—George E. A. Halvosa
*Attorney*—Robert K. Youtie

ABSTRACT: A housing circumposed about a relatively rotating member to be braked, a vaned wheel in the housing and rotatable therein together with the rotary member, and fluid feeding means for introducing fluid into the housing whereupon vane action on the fluid effects braking of the wheel and rotary member.

Patented Dec. 1, 1970
3,543,885
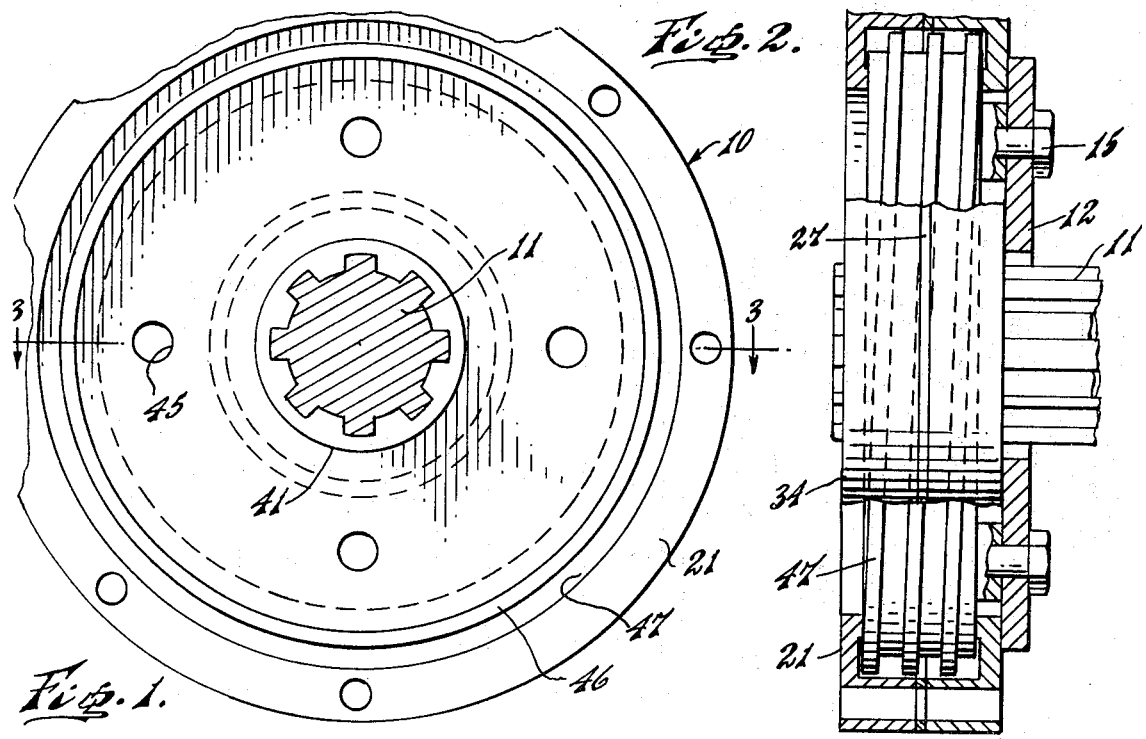
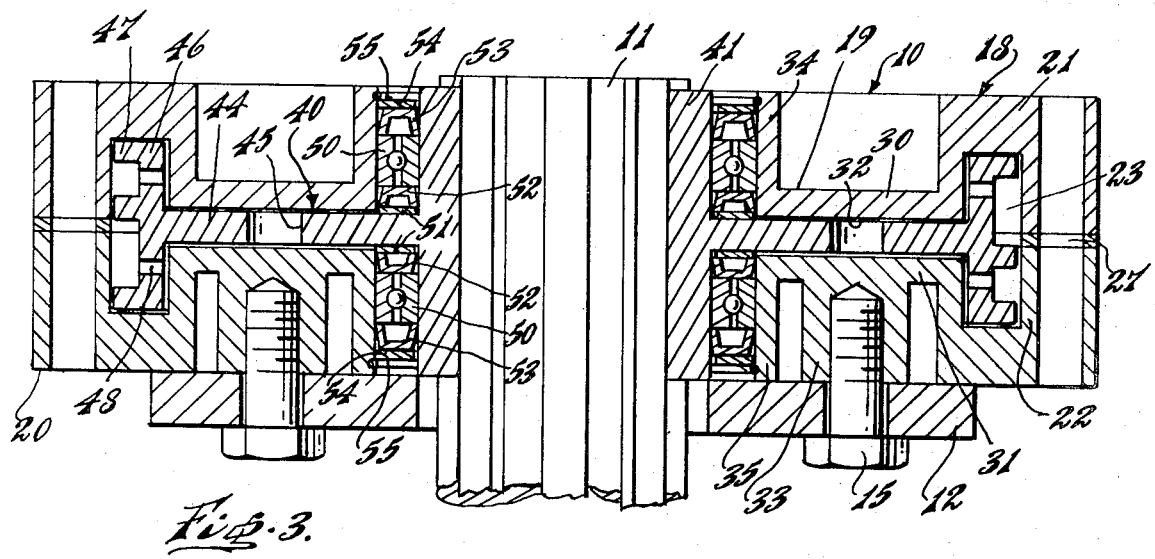
INVENTOR
Harry G. Dillow
BY Robert K. Youtie
ATTORNEY

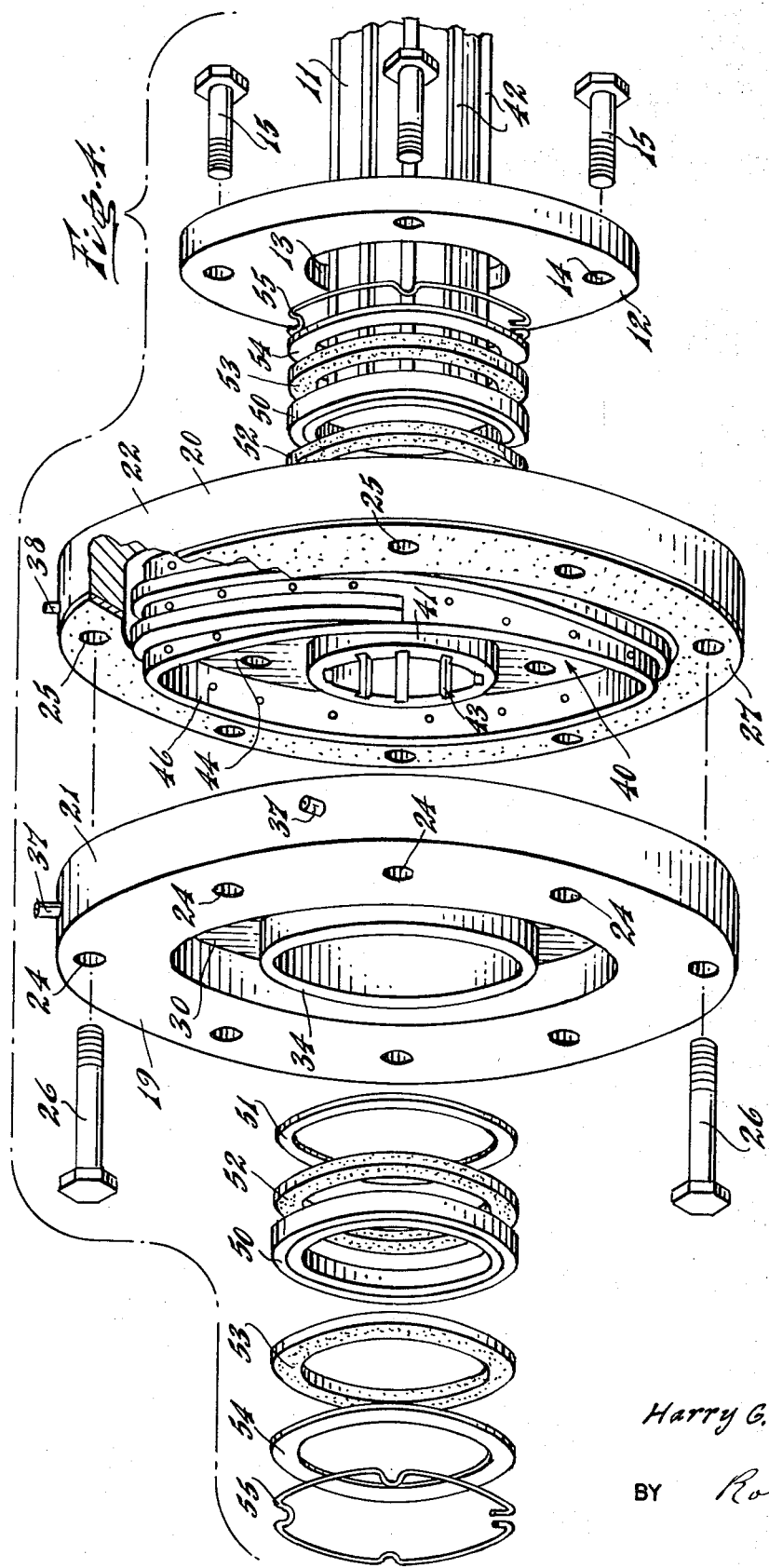

FLUID BRAKE DEVICE

BACKGROUND OF THE INVENTION

While the broad concept of utilizing liquid or fluid as a braking medium is known in the art, prior fluid or liquid braking devices have not been found acceptable, being deficient both economically and in performance.

SUMMARY OF THE INVENTION

Accordingly, it is an important object of the present invention to provide a fluid or liquid type braking device which is highly effective in performance and capable of economic manufacture, installation and maintenance.

It is a further object of the present invention to provide a braking device of the type described which is substantially free from wear as it employs no shoes and therefore requires no relining, may be used continuously or repeatedly without fade, is completely isolated from dirt and humidity so as to be unaffected thereby for constantly repeatable results under all conditions of use, and which is durable and entirely reliable throughout a long useful life.

While the brake device of the present invention has been primarily developed for automotive use, and will be illustrated and described hereinafter with particular reference thereto, it is appreciated that the instant device is capable of effecting braking action of any rotary motion in a wide variety of mechanisms, all of which are intended to be comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an end view showing a brake device of the present invention with a housing section removed.

FIG. 2 is a side view of the brake device of FIG. 1, with the housing broken away to illustrate certain internal construction.

FIG. 3 is a transverse sectional view taken generally along the line 3–3 of FIG. 1.

FIG. 4 is an exploded perspective view of the brake device of FIGS. 1—3.

DESCRIPTION OF THE PREFERRED EMBODIMENT

Referring now more particularly to the drawings, and specifically to FIGS. 1—3 thereof, the brake device is there generally designated 10, and is circumposed about a rotary member or shaft 11, for example, the rear wheel shaft or axle of an automotive vehicle. As seen in FIGS. 3 and 4, there is a fixed annular plate 12, which may have a central through opening 13 rotatably receiving the shaft 11. The plate 12 is fixed to the vehicle frame by any conventional means (not shown) and may be provided with a circular array of fastener receiving through holes 14. The braking device 10 is fixed to and carried by the plate 12, say being fastened to the plate by fasteners or bolts 15, as will appear more fully hereinafter.

The braking device 10 includes an outer casing or housing 18, which may be of generally sectional construction, including a pair of complementary sections 19 and 20. The housing 18 is of generally annular configuration extending coaxially about the shaft 11, and each housing section 19 and 20 is of an annular configuration arranged in facing relation with each other.

More particularly, each housing section 19 and 20 includes a circumferential portion, respectively designated 21 and 22, which portions are of generally U-shaped or channellike cross sectional configuration with their hollows or concave regions in facing relation. As best seen in FIG. 3, the channel-shaped circumferential portions of respective housing sections 19 and 20 combine to provide a circumferential, hollow housing part defining an annular interior hollow 23. The circumferential outer portions 21 and 22 of housing sections 19 and 20, radially outward beyond the annular hollow 23, are preferably provided with an annular array of alined through fastener receiving openings or holes, as at 24 and 25, for receiving fasteners or bolts 26. In this manner, the housing sections 19 and 20 are effectively clamped together, and a sealing gasket or ring 27 may be interposed between the facing clamped circumferential housing portions 19 and 20.

Extending radially inwardly from the radially inner side of circumferential housing portion 21 is a generally flat, annular wall or web 30 extending entirely about the inner side of the circumferential portion. A similar wall or web 31 extends radially inwardly from the radially inner side of the circumferential housing portion 21, also being of flat annular configuration and in adjacent spaced confronting relation with the wall 30. Thus, the facing spaced walls or webs 30 and 31 of housing sections 19 and 20, respectively, define therebetween a circumferentially extending, relatively narrow space 32 which communicates at its radial extremity with the interior of the hollow or chamber 23. The wall 31, on its outer side, may be provided with a plurality of bosses 33 for receiving the fasteners or bolts 15, thereby affixing the housing 18 to the plate 12.

The inner diameter of housing wall or web 30 is provided with an annular, radially outstanding flange or hub section 34; and similarly, the inside diameter of the web or wall 31 is provided with an annular radially outstanding flange or hub section 35. The hub sections 34 and 35 are in axial alinement with each other, combining to define a housing hub, and are radially spaced from the shaft 11.

The housing 18, say in the circumferential portion 21 of section 19, is provided with one or more fluid inlets or ports, advantageously in an upper region of the housing. The fluid inlets or ports may be three in number, as represented by nipples 37, best seen in FIG. 4, for connection to a source of fluid supply under pressure. The inlet nipples or connecters 37 may preferably be located in equally spaced relation above the horizontal center line of the housing. Also, one of the housing sections, say section 20, may be provided with a bleed fitting or screw 38, say in an upper most region of the circumferential portion 22, for bleeding or removing air.

Interiorly of the communicating chambers 23 and 32 is located a wheel, generally designated 40. The wheel 40 includes a hub 41 circumposed about the shaft 11 spacedly within the housing hub 34, 35. The shaft 11 is illustrated as splined, having a plurality of longitudinal splines or ribs 42, and the inside diameter of the hub 41 is conformable recessed, as at 43 for nonrotative interfitting reception of shaft 11 in hub 41. Extending radially outwardly from the hub 41, circumferentially thereabout is a wheel wall or web 44 which is closely received in the space 32 between housing walls 30 and 31. The wheel web 44 is provided with a circular array of through holes 45 affording fluid communication through the wheel web for a purpose appearing presently. The annular generally flat wheel web 44 extends from the hub 41 in the interhousing wall space 32 to the annular housing chamber 23, where it is provided with an enlarged circumferential flange or rim 46. Thus, it will be appreciated that the wheel 40, including its hub 41, web 44 and rim 46 rotate, together with the shaft 11, within the housing 18, the latter remaining fixed to the immovable plate 12.

As best seen in FIG. 3, the rim 46 of wheel 40 extends in an axial direction with respect receiving chamber 23, however the rim is of a thickness less than the radial dimension of the chamber 23 and lies entirely in the radially inner region of the chamber. Provided on the radially outer surface of the rim 46, within the radially outer region of chamber 23, are spiral vanes 47, which may assume the generally configuration of a worm thread. That is, the spiral vanes or threads 47 extend along the exterior of the wheel rim 46 coaxially of the shaft 11. In practice there may be a single relatively long worm thread or vane extending about one and a half times around the rim 46, and a pair of additional shorter vanes or threads adjacent to opposite edges of the rim. Of course, outer suitable arrangements of spiral vanes may be employed, as desired. However, it will be observed that the spiral vanes 47 extend completely across the outer surface of the rim 46, so that rotation of the wheel 40, together with the rim 46 and vanes 47 define a path of movement which substantially fully occupies the chamber 23. At spaced locations through the rim 46, intermediate adjacent pairs of vanes 47, there may be provided through holes 48, for a purpose appearing presently Interposed between the wheel hub 41 and housing hub 34 are suitable journaling and sealing means. In particular, a pair of antifriction bearings 50 are interposed between the wheel hub 41 and housing hub 34 on opposite sides of the wheel web 44, to effectively rotatably support the wheel within the housing, On each side of the wheel web 44, in facing engagement therewith, is an annular washer 51, and interposed between each washer 51 and the adjacent bearing 50 is an oil seal 52. Outward of each bearing 50 is an oil seal 53, and a washer 54 engages the outer side of each seal 53. A retaining ring 55 is snap fit on the outer side of each washer 54 to retain the several washers and seals in proper relation. It will thus be understood that a highly effective fluid pressure seal exists between the wheel hub 41 and housing hub 34, 35.

In operation, absent any desired braking, the shaft 11 is free to rotate, together with its wheel 40, within and relative to the housing 18. This free rotation exists even though the interior chambers 23 and 32 of the housing 18 may be partially filled with oil or other suitable braking fluid. That is, by reason of the wheel web openings 45 and rim openings 48, there is a free transfer of fluid through the opening so that braking force is not exerted. However, upon the feeding of liquid into the interior of housing 18, as through ports 37, upon substantial filling of the housing, a highly effective braking force will be imparted to the shaft by reason of the attempted relative movement of the vanes 47 in the chamber 23. That is, the degree of braking action will be dependent upon the degree of filling of the chamber by fluid. This may be understood very readily by visualizing a chamber 23 completely filled by fluid. Upon turning of the wheel, the vanes 47 tend to force the fluid in one direction, and as the fluid is incompressible and cannot escape, a most effective braking action is applied to the wheel. Of course, this braking action is equally effective upon rotation of shaft 11 in either direction, as the force of fluid imparted by the vanes is equally resisted in both directions. Upon mere release of fluid from the chamber 23, as by removal of pressure from a foot brake, the fluid will remove itself from the housing 18 through the ports 37 for reuse as required in the above-described manner.

From the foregoing, it is seen that the present invention provides a brake device which fully accomplishes its intended objects and it is well adapted to meet practical conditions of manufacture, installation, maintenance and use.

Although the present invention has been described in some detail by way of illustration and example for purposes of clarity of understanding, it is understood that certain changes and modifications may be made within the spirit of the invention.

I claim:

1. A brake device for braking a rotary member, said device comprising an annular internally smooth hollow housing extending about and having its inner circumference opening toward the rotary member, mounting means mounting the housing in fixed relation for rotation of the rotary member relative to the housing, a wheel disposed closely conformably within the housing for rotation therein and adapted for connection through the inner circumference of the housing to the rotary member for rotation with the latter, an enlarged rim on the outer circumference of said wheel within the radially outer region of said housing hollow, spaced spiral vane means carried by the radially outer surface of said rim and movable with said rim to generate a volume substantially completely occupying the radially outer region of the housing hollow, and fluid conduit means connected to said housing for introducing fluid into and removing fluid from said housing, whereby fluid fed under pressure through said conduit means to substantially fill said housing effects braking action on said wheel relative to said housing and release of fluid pressure on said conduit means permits fluid removal to remove said braking action, said wheel and rim having openings for passing fluid and reducing pressure differentials in said housing.

2. A brake device according to claim 1, said wheel comprising a central disc extending radially inwardly from said rim, and said vane means comprising a worm thread coaxial with wheel rotation.

3. A brake device according to claim 2, said housing comprising a hollow circumferential part enclosing said rim and vane means, and a pair of walls each extending completely about the radially inner side of and radially inward from said circumferential part on opposite sides of said disc.

4. A brake device according to claim 3, in combination with a central hub carried by said disc for keyed engagement with a received rotary member, and a pair of bearing sleeves carried centrally by respective housing walls in journaling relation with said hub.

5. A brake device according to claim 3, said conduit means comprising fluid ports communicating through vertically spaced locations on said circumferential housing part for egress of fluid to the lowermost level of said ports upon release of fluid pressure to said conduit means.